(No Model.)
A. G. LYELL.
APPARATUS FOR SUPPLYING WATER FOR STOCK.
No. 280,051. Patented June 26, 1883.
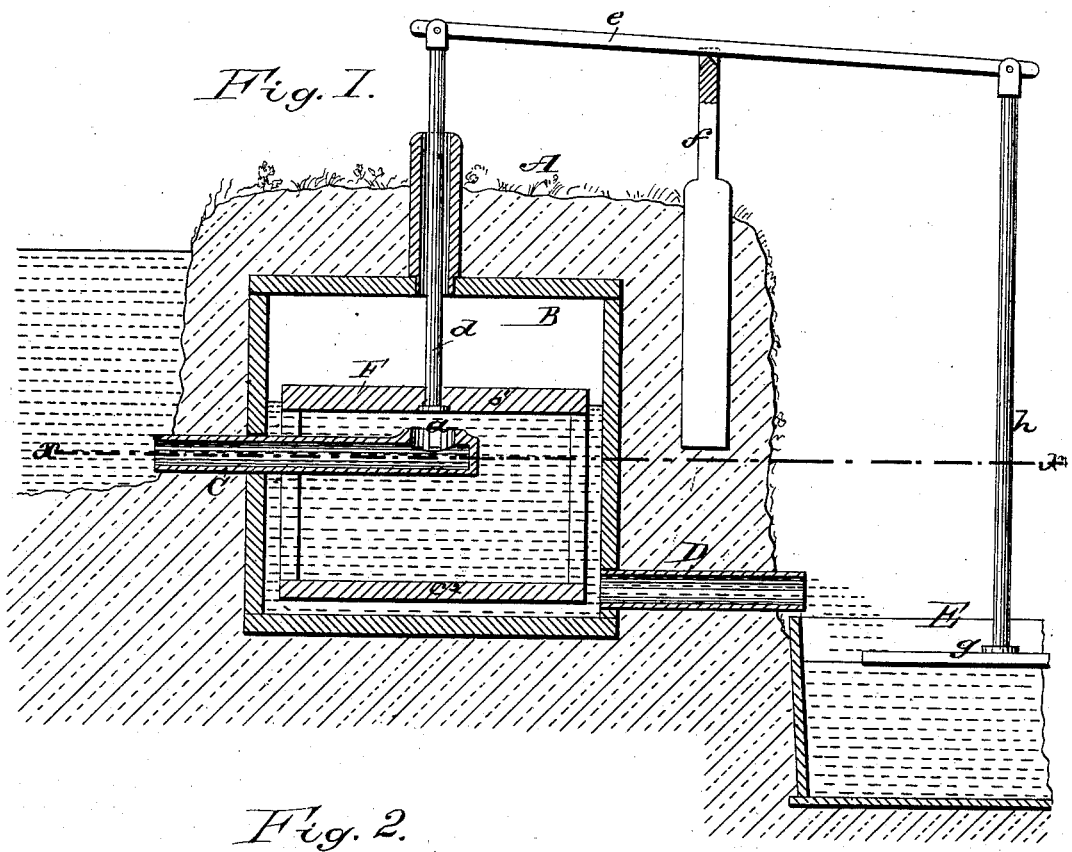
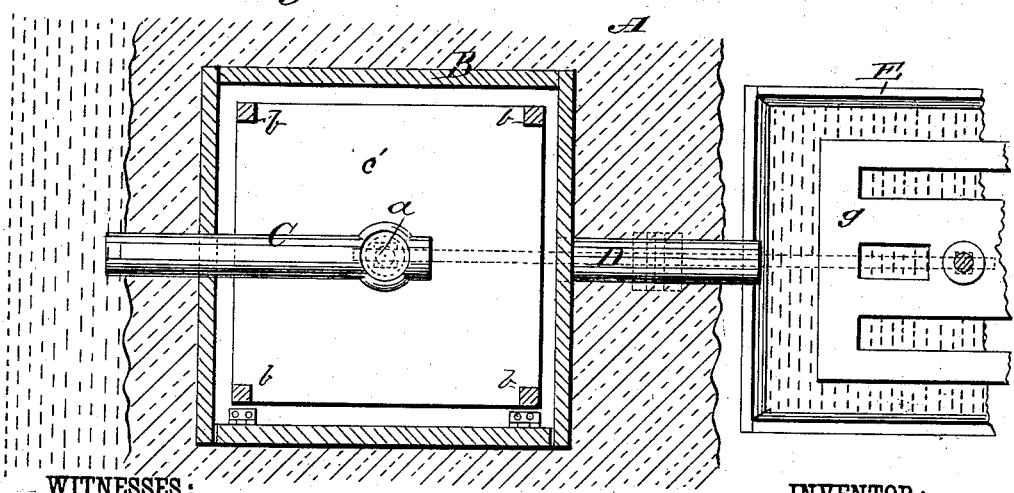

UNITED STATES PATENT OFFICE.

ALBERT G. LYELL, OF HUNNEWELL, MISSOURI.

APPARATUS FOR SUPPLYING WATER FOR STOCK.

SPECIFICATION forming part of Letters Patent No. 280,051, dated June 26, 1883.

Application filed December 4, 1882. (No model.)

*To all whom it may concern:*

Be it known that I, ALBERT G. LYELL, of Hunnewell, in the county of Shelby and State of Missouri, have invented a new and Improved Apparatus for Supplying Water for Stock, of which the following is a full, clear, and exact description.

The object of my invention is to secure a continuous supply of water for watering stock and for other purposes from reservoir-ponds, to regulate the supply automatically, so as to prevent waste, and to prevent the supply of water being cut off in freezing weather.

To these ends my invention consists in the apparatus hereinafter described and claimed.

Reference is to be had to the accompanying drawings, forming a part of this specification, in which similar letters of reference indicate corresponding parts in both the figures.

Figure 1 is a sectional elevation of my improved apparatus, showing the same as arranged in connection with a reservoir-pond. Fig. 2 is a sectional plan view on the line $x\ x$, Fig. 1.

A represents the dam for impounding the water and forming a supply-reservoir.

B is a box placed within the dam at a suitable depth to prevent its being reached by frost.

C is a water-supply pipe extending from near the bottom of the pond, or at a distance below the water-level, into the box B, and provided with an outlet, $a$, for discharge of the water into the box.

D is an outlet-pipe from the box, passing through the side of the dam and terminating above a trough, E, for discharging the water therein. The pipe D is lower than the pipe C, and is placed at the bottom of the box B, so as to insure the entire discharge of the water and prevent its becoming frozen in the pipe.

Within the box B is a valve or float, F, which, when raised, allows of the discharge of the water from the outlet $a$, and when lowered closes upon the said outlet, and thereby cuts off the water from the box B. The valve is suspended on a rod, $d$, that extends through the top of the box and above the top of the dam, where it is connected to a lever, $e$, that is fulcrumed on a post, $f$, placed at any suitable point. The outer end of the lever $e$ extends over the trough E, and from that end is suspended a float, $g$, which being raised and lowered according to the height of the water in the trough, the float or valve F in the box B is reversely moved, or the lever $e$ may be moved by hand to open and close the outlet $a$.

The float F consists of four corner-posts, $b\ b$, (see Fig. 2,) to the upper and lower ends of which the top and bottom horizontal plates, $c'\ c^2$, of the float F are secured, leaving the sides of the float open for the passage of water. When the float F is lowered by the raising of the water in the trough E, the lower plate, $c^2$, of the float is so arranged as to come in contact with the bottom of the box B, when the top plate, $c'$, has closed water-tight the outlet-pipe $a$, the weight of the float being sustained by the bottom of the box B and no weight being thrown on the free end of the pipe C, while at the same time, from the open construction of the float, the water has a free passage through the box B and float F to the pipe D.

In operation the water passing into the box B is discharged through the pipe D to the trough, and the discharge continues until, the float $g$ being raised, the valve F is moved down and outlet $a$ closed, thus cutting off the water. When water is used from the trough the valve F is again raised and the water again discharged until the trough is filled. By these means a supply of water will always be furnished according to the amount that is used, and the supply apparatus being placed beneath the ground, so as not to be affected by the frost, the operation will continue the same in freezing weather, even after the pond is frozen over.

If desired, the inner end of the trough may be covered by the dam and the float-rod work through a tube set in the dam.

Having thus described my invention, I claim as new and desire to secure by Letters Patent—

The combination, with the water-box B, provided with inlet-pipe C and outlet-pipe D, trough E, float $g$, lever $e$, and pitmen $h\ d$, of the open float F, provided with corner-posts $b$ and parallel horizontal top and bottom plates, $c'\ c^2$, substantially as described, and for the purpose set forth.

ALBERT G. LYELL.

Witnesses:
 WM. B. THIEHOFF,
 WILLIAM POLEN JANES.